(12) United States Patent
Siddiqui et al.

(10) Patent No.: US 11,150,727 B2
(45) Date of Patent: Oct. 19, 2021

(54) EYE AND HEAD TRACKING

(71) Applicant: Apple Inc., Cupertino, CA (US)

(72) Inventors: Matheen M. Siddiqui, Santa Clara, CA (US); Soumitry Jagadev Ray, Santa Clara, CA (US); Abhishek Sundararajan, Sunnyvale, CA (US); Rishabh Bardia, San Francisco, CA (US); Zhaoyi Wei, San Jose, CA (US); Chang Yuan, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/700,474

(22) Filed: Dec. 2, 2019

(65) Prior Publication Data

US 2020/0183492 A1   Jun. 11, 2020

Related U.S. Application Data

(63) Continuation of application No. 15/713,290, filed on Sep. 22, 2017, now Pat. No. 10,496,163.

(Continued)

(51) Int. Cl.
*G06F 3/01* (2006.01)
*G06K 9/00* (2006.01)
*H04N 13/383* (2018.01)
*G06T 7/73* (2017.01)
*G02B 27/00* (2006.01)
*G02B 27/01* (2006.01)

(52) U.S. Cl.
CPC ............... *G06F 3/013* (2013.01); *G06F 3/012* (2013.01); *G06K 9/00* (2013.01); *G06K 9/0061* (2013.01); *G06K 9/00201* (2013.01); *G06K 9/00335* (2013.01); *G06K 9/00597* (2013.01); *G06T 7/73* (2017.01); *H04N 13/383* (2018.05); *G02B 27/0093* (2013.01); *G02B 27/017* (2013.01); *G02B 2027/014* (2013.01); *G06T 2207/10012* (2013.01); *G06T 2207/10048* (2013.01); *G06T 2207/30201* (2013.01)

(58) Field of Classification Search
CPC ........... G06F 3/013; G06F 3/012; G06T 7/73; G06K 9/00335; G06K 9/00597; H04N 13/383
See application file for complete search history.

(56) References Cited

U.S. PATENT DOCUMENTS 8,885,882 B1   11/2014   Yin
8,913,789 B1   12/2014   Starner
(Continued)

OTHER PUBLICATIONS

International Search Report and Written Opinion received in PCT Application No. PCT/US2017/053044, dated Nov. 30, 2017.

*Primary Examiner* — Lisa S Landis
(74) *Attorney, Agent, or Firm* — Blank Rome LLP

(57) ABSTRACT

Systems, methods, and computer readable media to detect and track a user's eye gaze and head movement are described. In general, techniques are disclosed for identifying a user's pupil location and using this information, in conjunction with a three dimensional (3D) model of the user's head, perform gaze tracking operations. More particularly, techniques disclosed herein utilize pupil gradient information to refine an initial pupil location estimate. Once identified, the pupil's location may be combined with 3D head pose information to generate an accurate and robust gaze detection mechanism.

16 Claims, 12 Drawing Sheets

Related U.S. Application Data

(60) Provisional application No. 62/398,380, filed on Sep. 22, 2016, provisional application No. 62/398,398, filed on Sep. 22, 2016.

(56) References Cited

U.S. PATENT DOCUMENTS

| | | |
|---|---|---|
| 8,971,570 B1 | 3/2015 | Raffle |
| 9,329,682 B2 | 5/2016 | Keane |
| 2008/0049185 A1 | 2/2008 | Huffman |
| 2015/0077543 A1 | 3/2015 | Kerr |
| 2015/0310253 A1* | 10/2015 | Agrawal ............... G06F 3/013 382/103 |
| 2016/0026847 A1 | 1/2016 | Vugdelija |
| 2016/0170486 A1 | 6/2016 | Rydberg |
| 2016/0202756 A1 | 7/2016 | Wu |
| 2016/0202757 A1 | 7/2016 | Miao |
| 2016/0210497 A1 | 7/2016 | Rougeaux |
| 2017/0091548 A1 | 3/2017 | Agrawal |

\* cited by examiner

EYE AND HEAD TRACKING

BACKGROUND

This disclosure relates generally to the detection of eye and head movement. More particularly, but not by way of limitation, this disclosure relates to techniques for detecting pupil location and the use of that information, and a head model, to track gaze.

It has recently been noted that three dimensional (3D) head tracking using a video sequence, or pose estimation using multiple images is an essential prerequisite for robust facial analysis and face recognition. Eye tracking often forms the basis of these operations and may be thought of as the process of electronically locating the point of a person's gaze, or following and recording the movement of the person's point of gaze. In practice, eye tracking is provided by locating and tracking corneal reflections from an applied light source. Because infrared or near-infrared light is not perceivable by the human eye, it is often used as the light source; infrared or near-infrared light passes through the pupil but is reflected by the iris, generating a differentiation between the pupil and the iris.

SUMMARY

In one embodiment the disclosed concepts provide a method to capturing, during a first time period, one or more images from each of a first and second image capture device; emitting light, during the first time period, from a first and a third light emitter and not from a second and a fourth light emitter—illustrative light emitters include infrared or near-infrared light emitters. In one embodiment, the first and second image capture devices are juxtaposed to one another; the first and second light emitters are juxtaposed to one another and arranged to a first side of the first image capture device; and the third and fourth light emitters are juxtaposed to one another and arranged to a second side of the second image capture device. The disclosed methods may continue by capturing, during a second time period, one or more images from each of the first and second image capture devices; and emitting light, during the second time period, from the second and fourth light emitters and not from the first and third light emitters. In one embodiment the first and second image capture devices may be configured to have incompletely overlapping fields of view (e.g., to provide stereoscopic image information). In some embodiments, the disclosed methods may further comprise detecting a first eye using the one or more images captured during the first time period; determining an initial pupil location for the first eye, wherein the initial pupil location is defined in terms of a first two-dimensional (2D) region; identifying a second region wholly within the first region; identifying a third region wholly outside the first region; identifying that area between the second and third regions as a fourth region, the fourth region comprising a plurality of pixels; determining a gradient for at least some of the pixels in the fourth region; identifying a first set of pixels from the plurality of pixels, wherein each pixel in the first set of pixels has a gradient value that meets a first criteria; and identifying an updated pupil location for the first eye based on the first set of pixels. In other embodiments, the disclosed methods can include determining a first gaze direction based on the updated pupil location for the first eye. In still other embodiments, the disclosed methods can also include determining a plurality of gaze directions for the first eye based on a plurality of captured images captured at different times. In another embodiment, the various methods may be embodied in computer executable program code and stored in a non-transitory storage device. In yet another embodiment, the method may be implemented in an electronic device having image capture capabilities.

In one embodiment, the disclosed concepts describe a method for receiving one or more stereo images of a set of pupils, wherein each of the set of pupils is part of an eye of a head, calculating a location of each of the set of pupils from the stereo images, determining a head pose based on the one or more stereo images, identifying a location of the set of pupils in the head based on the determined head pose, and identifying a gaze using the head pose and the location of each of the set of pupils. In another embodiment, the various methods may be embodied in computer executable program code and stored in a non-transitory storage device. In yet another embodiment, the method may be implemented in an electronic device having image capture capabilities.

DETAILED DESCRIPTION

This disclosure pertains to systems, methods, and computer readable media to detect and track a user's eye gaze and head movement. In general, techniques are disclosed for identifying a user's pupil location and using this information, in conjunction with a three dimensional (3D) model of the user's head, perform gaze tracking operations. More particularly, techniques disclosed herein utilize pupil gradient information to refine an initial pupil location estimate. Once identified, the pupil's location may be combined with 3D head pose information to generate an accurate and robust gaze detection mechanism.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of eye tracking systems having the benefit of this disclosure.

Figure 1:
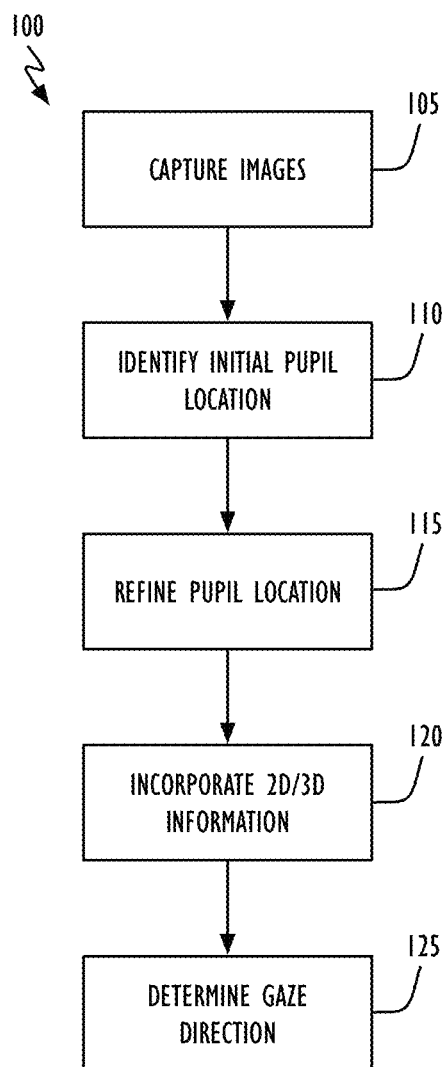
FIG. 1 shows, in flowchart form, a pupil identification operation in accordance with one embodiment.

Referring to FIG. 1, pupil identification operation 100 In accordance with this disclosure may begin by capturing multiple images that include one or more faces (block 105). From the captured images one or more eyes may be identified and, from these, corresponding initial pupil locations can be found (block 110). In one embodiment, the captured images may be a time sequence of still images having a resolution of 2-4 mega-pixels (MP). In another embodiment, the captured images may be a time sequence of video images captured at rates between 15 and 240 frames per second (fps). It should be noted, the image resolution and capture rate needed for a given embodiment depends on the operational requirements of the specific implementation. The initial pupil location may then be refined (block 115) and used in conjunction with other two-dimensional (2D) information or available three-dimensional (3D) information (block 120) to determine a user's gaze direction (125); which may be represented as a vector in three-space, the direction of which indicates the user's gaze.

Figure 2:
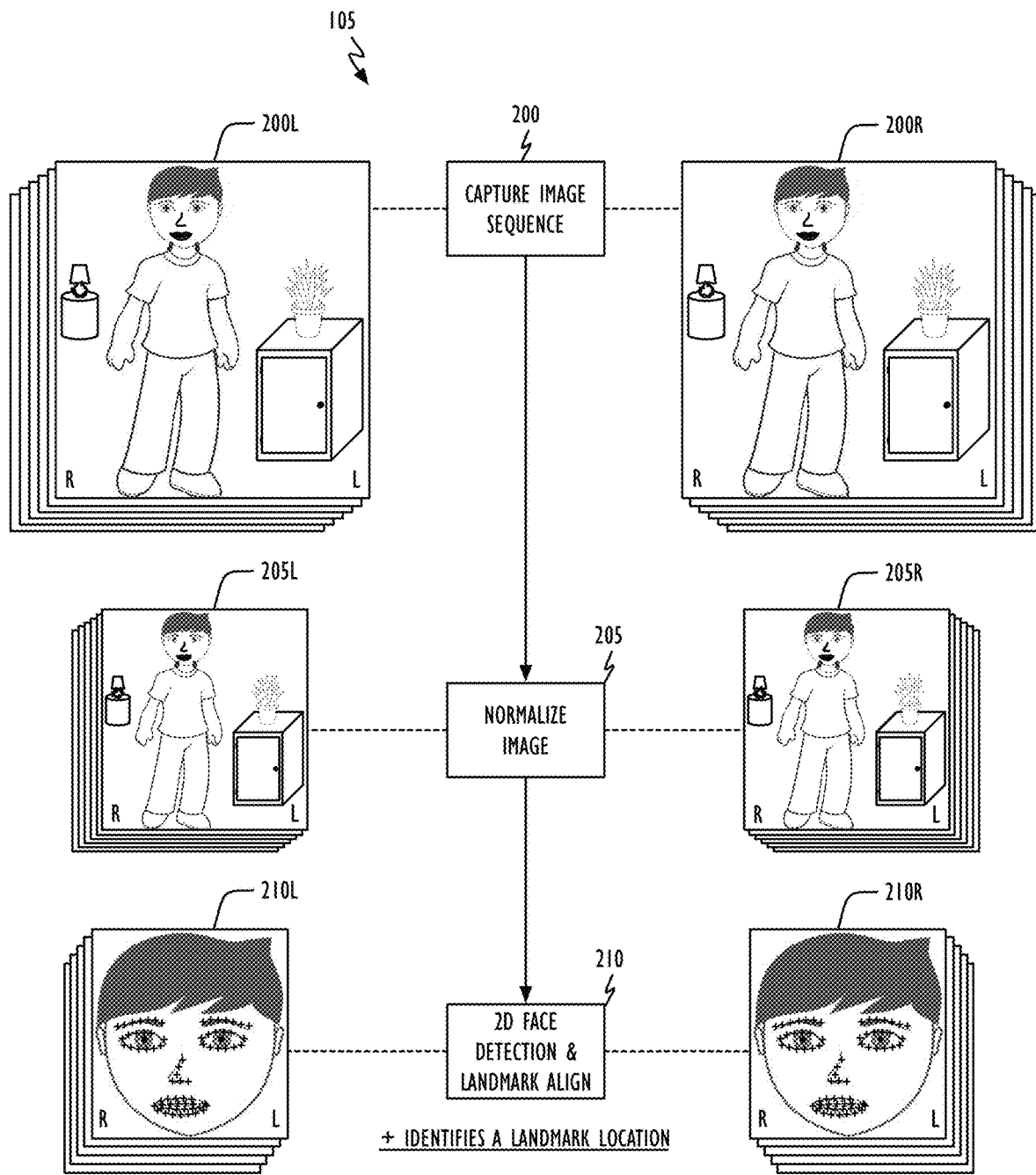
FIG. 2 illustrates an image capture operation in accordance with one embodiment.

Referring to FIG. 2, one illustrative image capture process in accordance with block 105 captures stereo video image sequences (block 200) including left channel sequence 200L and right channel sequence 200R. After normalization (block 205) creates left and right channel image sequences 205L and 205R, a face may be detected and landmark positions identified therein (block 210) to yield face image sequences 210L and 210R.

Figure 3:
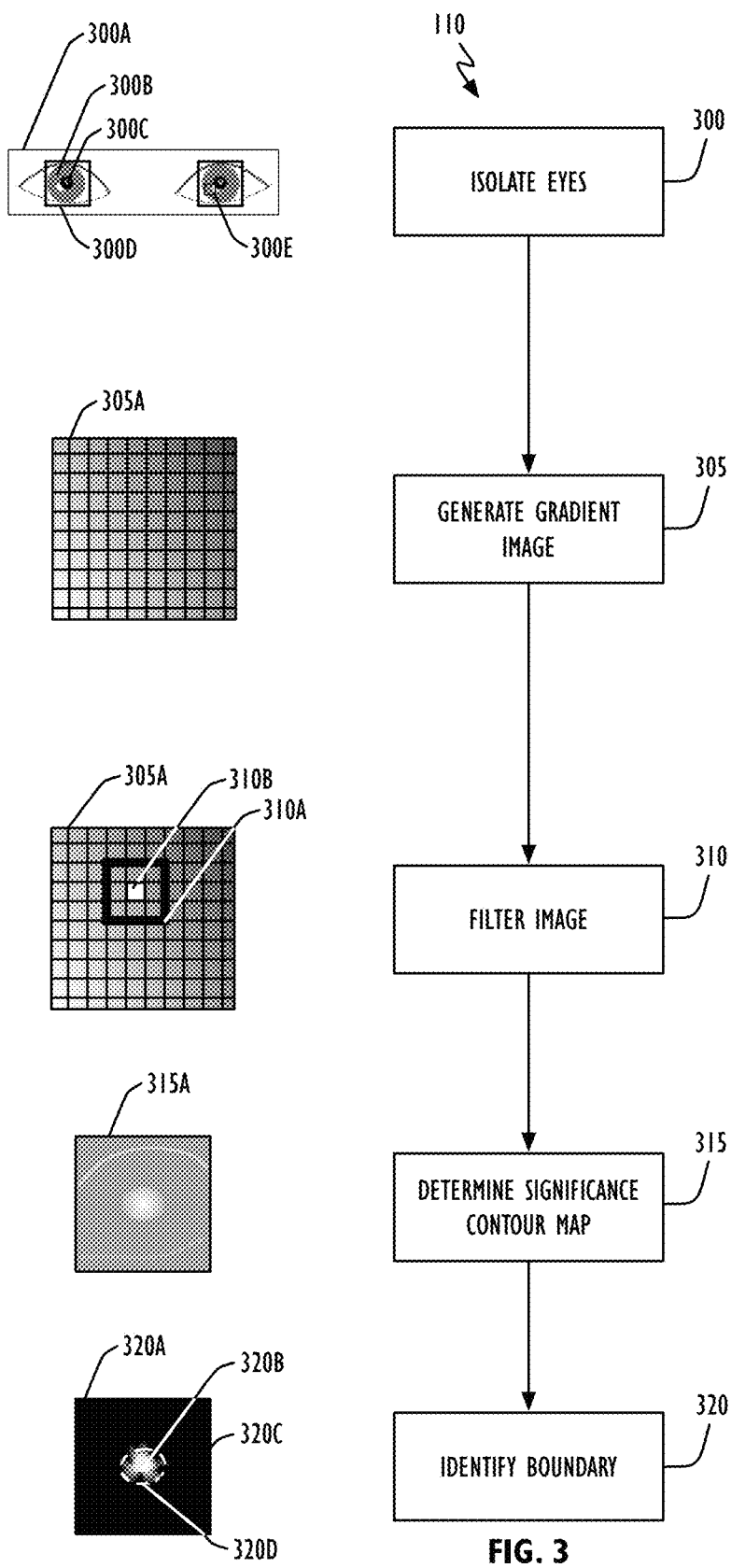
FIG. 3 shows, in flowchart form, an initial pupil identification operation in accordance with one embodiment.

Referring to FIG. 3, in one embodiment initial pupil localization operation 110 may begin by isolating each detected eye in image sequences 210L and 210R (block 300). By way of example, isolated eye pair 300A is shown with each iris 300B and pupil 300C enclosed within bounding box 300D. Once isolated, a gradient image of each eye may be generated (block 305). In some implementations, the isolated eye images may be filtered or smoothed prior to generating the gradient images. In one embodiment, a gradient image may be obtained by taking a gradient of each pixel's luminance value. In another embodiment, a gradient image may be obtained by taking a gradient of each pixel's red (G), green (G) or blue (B) channel value. For example, element 305A illustrates the gradient of region 300E. Each gradient image may then be filtered (block 310). In one embodiment, filtering may be based on a neighborhood (e.g., region 310A) around each pixel (e.g., pixel 310B). One illustrative neighborhood-based filtering operation is the non-max operation wherein a pixel's value (e.g., gradient pixel 310B) is replaced with the maximum value of all pixels within the corresponding neighborhood (e.g., region 310A). While illustrative region 310A is shown as 3×3 pixels, this region could be any size or shape that makes sense for the intended implementation (e.g., 5×5, 4×8, 6×9 or 7×3). From the filtered gradient image, a contour map representative of each pixel's significance may be found (block 315). First, it should be recognized that a gradient map provides, at each pixel, a magnitude and a direction. The gradient's value represents how much the pixel's value is changing (e.g., intensity or color), and the direction is indicative of a direction perpendicular to an edge at the pixel (e.g., pointing to a region of maximum blackness). Based on this recognition, significance contour map 315A may be generated by overlaying an initially empty (e.g., zero-valued) contour map with the gradient map generated in accordance with block 305. For each pixel in the initially empty contour map, every gradient from the gradient map that lies along or runs through the pixel may cause that pixel's value be incremented (e.g., by '1'). The more gradients that pass through a given pixel, the larger that pixel's corresponding value in the resulting significance contour map (see, for example, significance contour map 315A corresponding to the eye region circumscribed by bounding box 300D). The resulting significance contour map (e.g., 315A) may be used to identify an initial ellipse boundary for the underlying pupil (block 320). In practice, it has been found beneficial to apply a soft-threshold to each pixel in contour map 315A. Resulting image 320A can yield two or more regions that are in sharp contrast. For example, bright region 320B corresponding to a pupil and dark region 320C corresponding to a non-pupil region. Ellipse 320D may then be fit to region 320C thereby identifying an initial pupil location. While each implementation may have its own specific soft-threshold, one illustrative threshold may be 90%. That is, all pixel values in significance contour map 315A that are greater than 90% (or whatever the selected threshold may be) of the map's largest value may be left unchanged. All other pixels may be set to zero.

Figure 4:
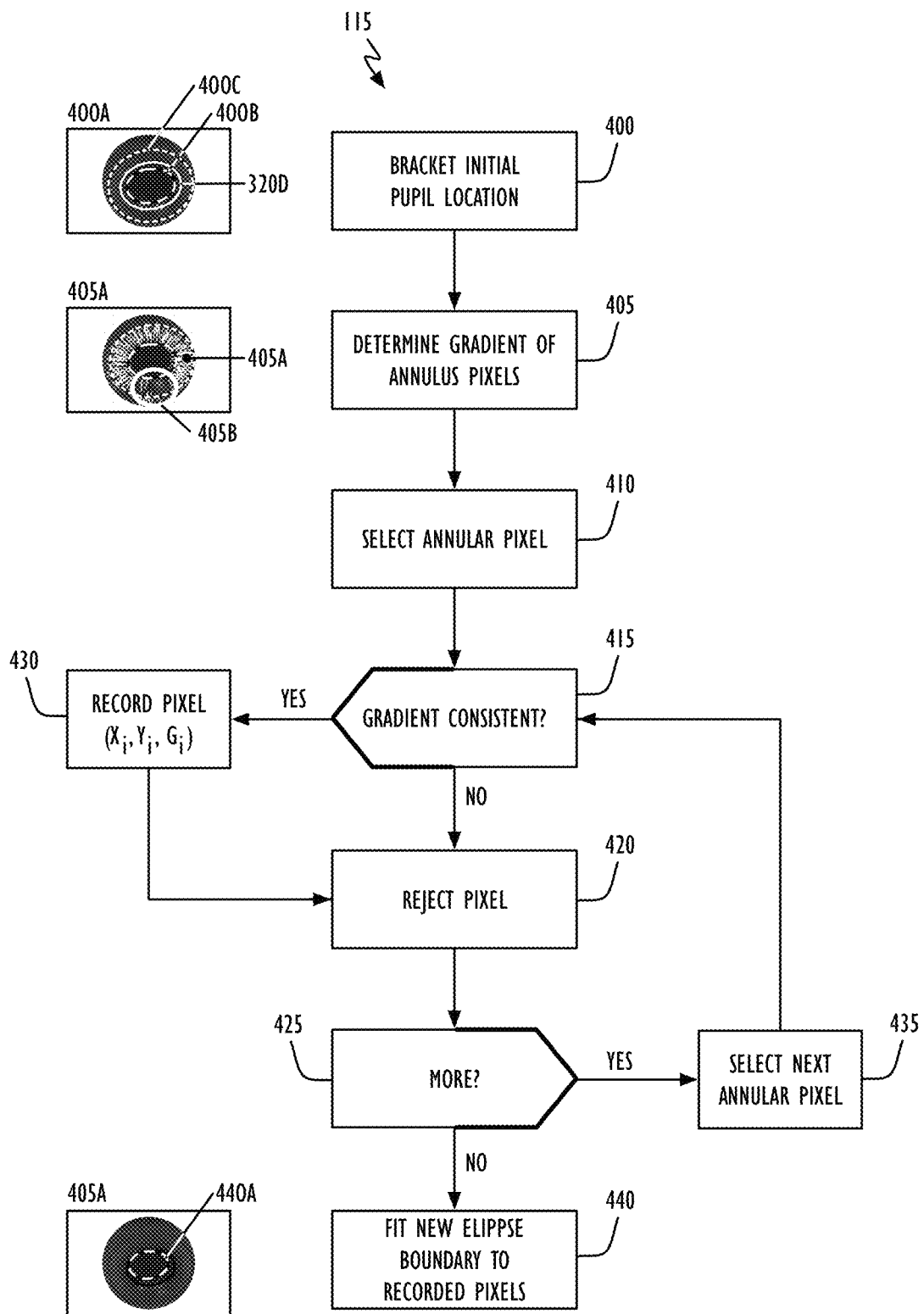
FIG. 4 shows, in flowchart form, pupil location refinement operation in accordance with one embodiment.

Referring to FIG. 4, pupil location refinement operation 115 in accordance with one embodiment may begin by "bracketing" the initially identified pupil location (block 400). By way of illustration, eye region 400A is shown with initial pupil location ellipse 320 and first and second bracket ellipses 400B and 400C. In one embodiment, inner ellipse 400B may have radii 75% of initial ellipse 320D and outer ellipse 400C may have radii 125% of initial ellipse 320D. In another embodiment the value of the selected percentages may be a function of the size of initial ellipse 320D. In yet another embodiment inner and outer ellipse sizes may be determined my maximizing a given cost function. For example, one approach could start at initial ellipse 320 and shrink the radii a given amount until an objective function such as contrast is maximized. Similarly, one could start at initial ellipse 320 and increase the radii a given amount until another, or the same, objective function is maximized. Whatever approach is chosen, there should be generated a region (annulus) within which initial ellipse 320D resides.

Next, the gradient of each vector in the annulus (created by inner and outer ellipses 400B and 400C) may be determined (block 405). As illustrated by region 405A, such an operation may identify 2 or more regions. The first (e.g., region 405A) includes gradient values (represented as white lines) of relatively consistent gradient values. The other (e.g., region 405B) includes gradient values that are inconsistent with those in region 405A. It should be realized that more than two regions may exist. It has been found, however, that a majority of the gradients are consistent with one another while others are inconsistent with these and themselves. As used here, "consistent" means gradient values or magnitudes that are relatively the same. In one embodiment, a value that is within 20% of the mean gradient magnitude value may be considered consistent. The amount these values may vary can change from implementation to implementation may be thought of as a tuning parameter of the overall system operation. It has been found that inconsistent regions correspond to lighter regions while consistent values correspond to dark regions (as would be expected of a pupil). A first annular pixel from region 405A may then be selected (block 410) and a check made to determine if it's value is consistent (block 415). If the selected pixel's gradient value is not consistent (the "NO" prong of block 415), the pixel may be rejected (block 420) and a further check made to determine if additional annulus pixels remain to be processed (block 425). If the selected pixel's gradient value is consistent (the "YES" prong of block 415), the pixel may be recoded (block 430). In one embodiment, each such pixel may be uniquely identified by its 2D location in eye region 405A ($x_i$, $y_i$) and gradient value ($g_i$). If additional annulus pixels remain to be reviewed (the "YES" prong of block 425), a next pixel may be selected (block 435), where after pupil location refinement operation 115 can continue at block 415. If no more annulus pixels remain to be inspected (the "NO" prong of block 425), the pixels recorded in accordance with block 430 may be used to fit a new/revised ellipse (block 440) as illustrated by ellipse 440A.

Figure 5:
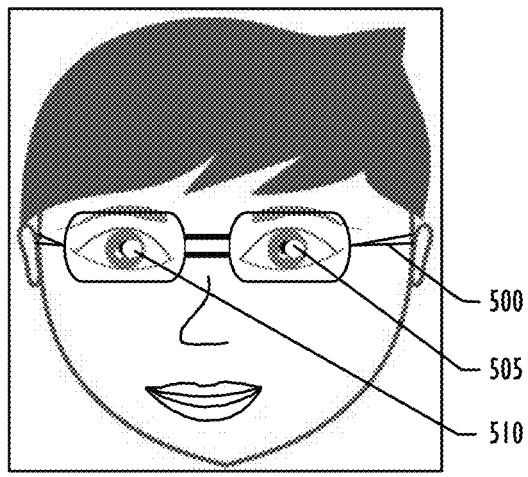
FIG. 5 illustrates pupil glare generated by prior are lighting techniques.
Figure 6:
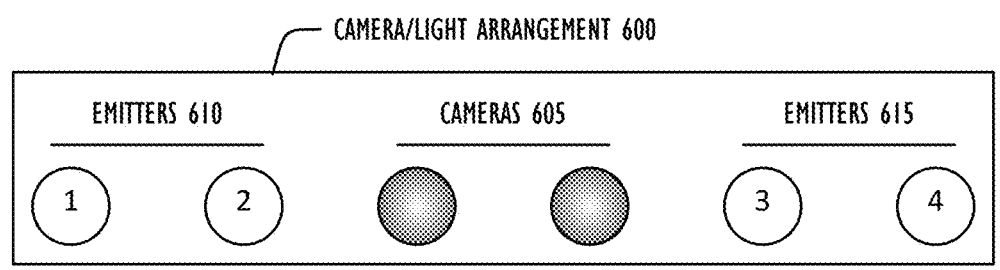
FIG. 6 shows, in block diagram form, a novel lighting and camera arrangement in accordance with one embodiment.
Figure 7A:
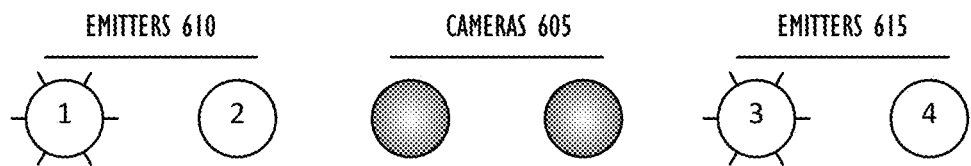
FIGS. 7A and 7B illustrate pupil glare movement generated by the lighting and camera arrangement in accordance with this disclosure.
Figure 7A:
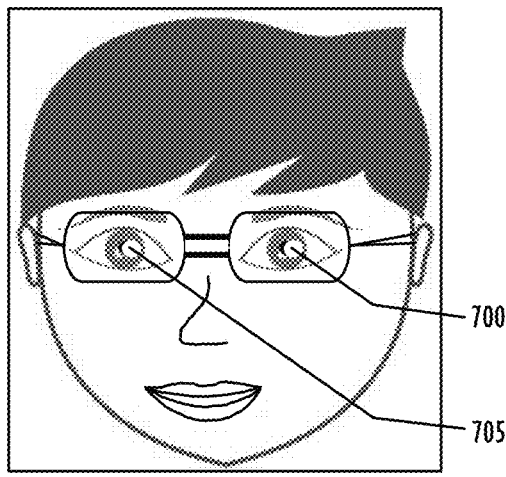
Figure 7B:
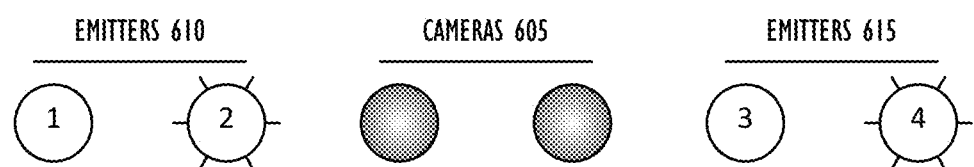
Figure 7B:
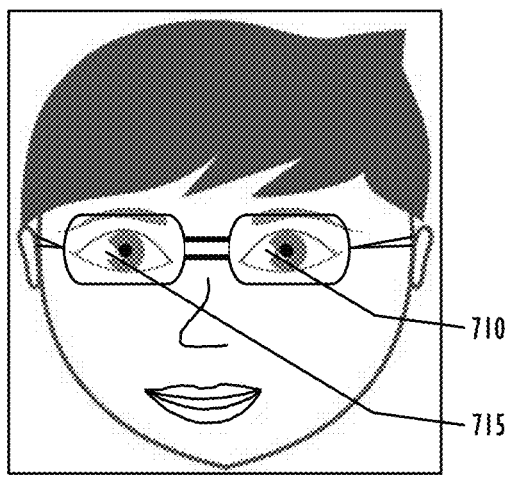

Referring to FIG. 5, it has been found that glasses 500 can often generate glare regions 505 and 510 and that such glare regions can obscure the underlying pupil. Referring to FIG. 6, to overcome the difficulty introduced by glare regions overlapping target pupils, novel camera and light arrangement 600 has been developed. As shown, camera and light arrangement 600 includes a stereo pair of cameras 605 with a pair of light emitters on each side, 610 and 605 respectively. Referring to FIG. 7A, when emitters 1 and 3 are illuminated glare regions 700 and 705 may move in a first direction while, in FIG. 7B, when emitters 2 and 4 are illuminated glare regions 710 and 715 may move in a second (different) direction. By alternatively illuminating the target with emitters 1-3 and 2-4 the glasses-induced glare regions may be caused to move thereby exposing at least one pupil. In some embodiments, a first image may be captured when emitters 1 and 3 are activated and another image captured when emitters 2 and 4 are activated. In other embodiments, multiple images may be captured during each activation of each emitter pair. Emitters 610 and 615 may emit light in the near infrared (nIR) range of 700-1,000 nanometers (nm). For example, commonly available 720 nm emitters may be used.

Figure 8:
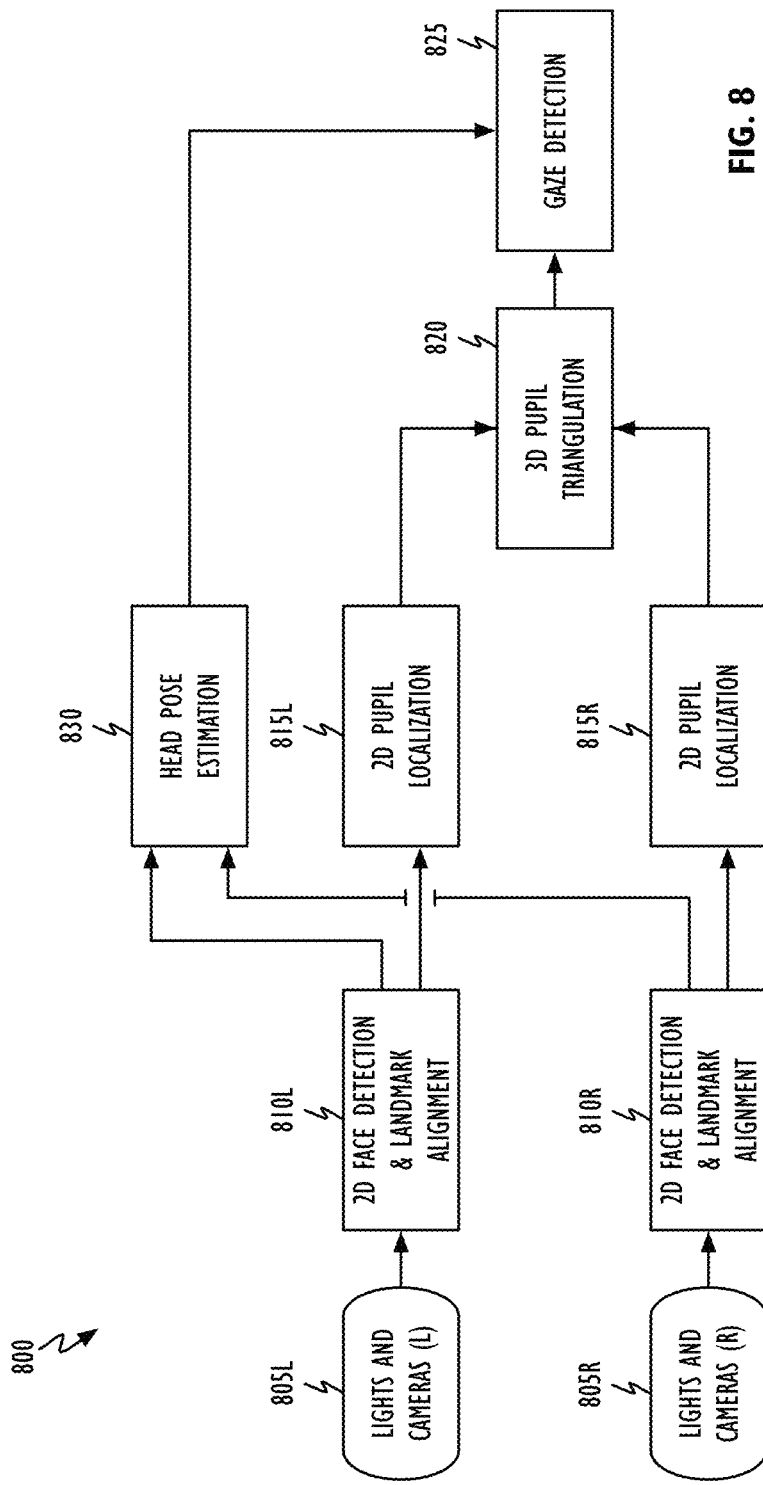
FIG. 8 shows, in block diagram form, a system for performing pupil localization and gaze tracking in accordance with one embodiment.

FIG. 8 shows, in block diagram form, system 800 for performing pupil localization and gaze tracking in accordance with one embodiment. System 800 depicts stereo pair of cameras 805L and 805R with a pair of light emitters. As described above, the pair of stereo cameras may be used to determine a pupil location. In one or more embodiments, the pair of stereo cameras 805L and 805R may additionally be utilized to determine a user's gaze vector. In one or more embodiments, gaze detection begins by performing 2D face detection and landmark alignment at 810L and 810R. According to one or more other embodiments, any kind of face detection may be performed. For example, a face may be detected based on feature detection, or using a model system. In one or more embodiments, the landmarks may be identified using feature detection. The landmarks may identify identifiable characteristics of a face. For example, landmarks may be detected that identify the shape of a brow or the corners of eyes.

According to one or more embodiments, the location of the landmarks allows for head pose estimation 830 and 2D pupil localization 815L and 815R. In some embodiments head pose estimation may be done in any number of ways. One example, using the face detection and landmark alignment, may include performing a regression analysis of a current head against a test set of head poses. That is, the relation of the various landmarks may be compared against the relation of landmarks of others in a test set of images, where the head pose is known in the test set of images. As another example, a head pose may be determined based on a geometric analysis of the various landmarks of the face. For example, linear mapping may provide information about the geometry of facial features as compared to a model. Certain landmarks may lend themselves to determining a ground truth alignment. For example, two eyes are often aligned. In one or more embodiments, the landmarks may be analyzed to determine an alignment from ground truth in order to determine a head pose.

With respect to pupil localization, any number of methods may be used, including the methods described above. By way of example, the method depicted in FIG. 3 may be used to identify the location of the pupils. After 2D pupil location has been identified the left eye at 815L and the right eye at 815R, 3D pupil triangulation may be performed (block 820). At block 825, a gaze may be determined. In one or more embodiments, determining the gaze may involve determining the location of the pupil in relation to the eye. The head pose and pupil locations may be used to detect the gaze. The process of gaze detection will be described in greater detail below with respect to FIGS. 11 and 10.

Figure 9:
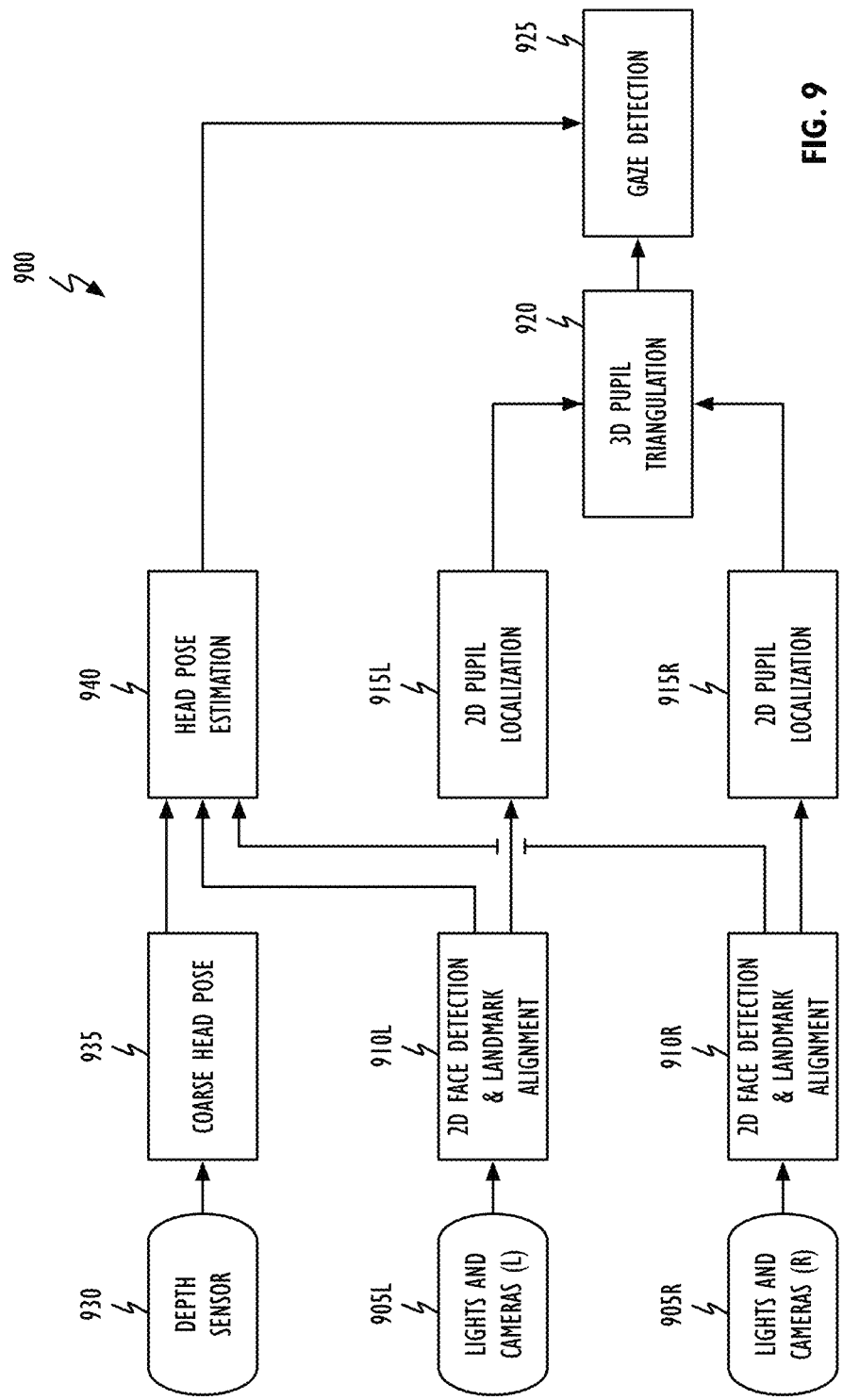
FIG. 9 shows, in block diagram form, a system for performing pupil localization and gaze tracking in accordance with one embodiment.

FIG. 9 shows, in block diagram form, system 900 for performing pupil localization and gaze tracking in accordance with another embodiment. System 900 may be performed as an alternative to the steps depicted and described with respect to FIG. 8. Specifically, whereas in 800 the image and depth information is obtained from stereo images from stereo camera systems 805L and 805R, in system 900 additional depth information may be obtained by depth sensor 930. Illustrative techniques to determine or acquire depth information include sheet of light triangulation, structured light, time-of-flight, interferometry and coded aperture techniques. According to one or more embodiments, one or more depth sensors may provide information from which a depth map of the head may be generated. Based on the depth information received from depth sensor 930, a coarse head pose 935 may be determined. For example, the geometry of features detected in the depth map may be compared against a model to determine an initial guess of the head pose, or the coarse head pose. At block 940, the coarse head pose may be compared against 2D face detection information and landmark alignment data from 910L and 910R, based on the stereo images received from stereo camera systems 905L and 905R. The coarse head pose may be refined based on the coarse head pose 935 and the image information received from the 2D face detection information and landmark alignment data from 910L and 910R.

Refined head pose estimation 940 may be used to detect a gaze at 925. Similar to the flow depicted at 800, in system 900 the gaze detection 925 may involve determining the location of the pupil in relation to the eye. The location of the pupils may be determined by an initial pupil localization step at 915L and 915R to determine a 2D location of the pupils. The location of the pupils may further be determined based on a 3D pupil triangulation operation 920.

Although systems 900 and 800 each depict detecting a gaze using a set of stereo cameras and a depth sensor, in one or more other embodiments different hardware may be used. That is, in some embodiments the depth information and images may be collected using a different type of camera, or a different number of cameras. Thus, the gaze may be detected using any data that may be used to determine a 3D location of a set of eyes. The process of gaze detection will be described in greater detail below with respect to FIGS. 10 and 11.

Figure 10:
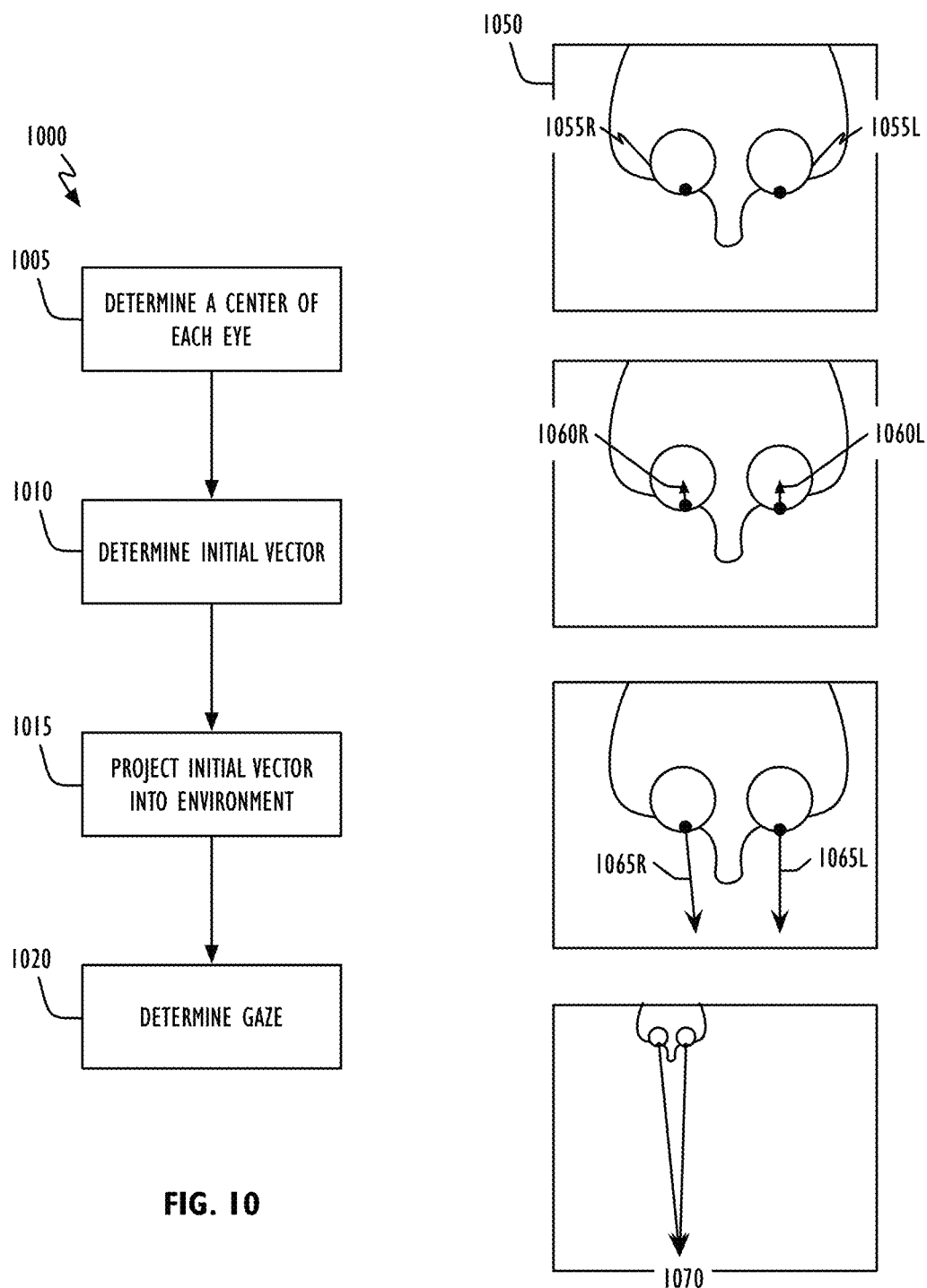
FIG. 10 shows, in block diagram form, a method for detecting a gaze, according to one or more embodiments.

FIG. 10 shows, in flowchart form, method 1000 for detecting a gaze according to one or more embodiments. According one embodiment, operation 1000 depicts a more detailed description of gaze detection 925 or 825. Although the various steps are depicted in a particular order, it should be understood that in one or more embodiments, the various steps may be performed in a different order, or some steps could be performed concurrently. Further, some steps may not be necessary, or other actions may be added. Moreover, for purposes of explanation, the various steps will be explained with respect to FIG. 9. However, it should be understood that the various steps could also apply to FIG. 8, or other figures described above. Moreover, the various steps could also apply to other embodiments not specifically depicted in the various examples.

Operation 1000 begins at 1005 where a center of each eye is determined. As shown in example 1050, the eye centers 1055R and 1055L may identify the center of the sphere of the eye. The center of the sphere of the eye may indicate, for example, a pivot point of each of the eyes. According to one or more embodiments, the center of each eye may be determined in a number of ways. In one embodiment, the head pose determined at 940 may indicate a general location of the eyes. For example, the various images captured by the stereo cameras at 905L and 905R and depth information from depth sensor 930, where available, may be used to determine a location of each of the eyes. The use of the head pose to determine the center of each eye will be explained in further detail below with respect to FIG. 11. The center of each of the eyes may also be identified in a number of ways. By way of example, movement of the eyes of the subject (i.e., the person whose gaze is being detected) may be tracked. Given the rotation of the eyes over time, a pivot point of the eye may be determined. In one embodiment, the subject may be directed to gaze at a number of known targets. The various gaze vectors may be analyzed to identify a common eye center. As another example, once the pupils are located at 915L and 915R, some known measure can be used to extrapolate the size of the eye. That is, if the size of the pupil is known, the eye radius may be roughly estimated, using a general guideline of a known ratio of pupil size to eye radius.

Operation 1000 continues at 1010 where an initial vector 1060R and 1060L may be calculated for each eye from the center of the pupil of the eye to the center of the eye. According to one or more embodiments, the pupil of each eye may be determined in any number of ways, including those described above. At 1015, the initial vectors from the center of the pupil to the center of the eye may be projected out to the environment, as shown by 1065R and 1065L. Then, at 1020, a gaze 1070 of the eyes based on an intersection of the gaze vectors 1065R and 1065L.

Figure 11:
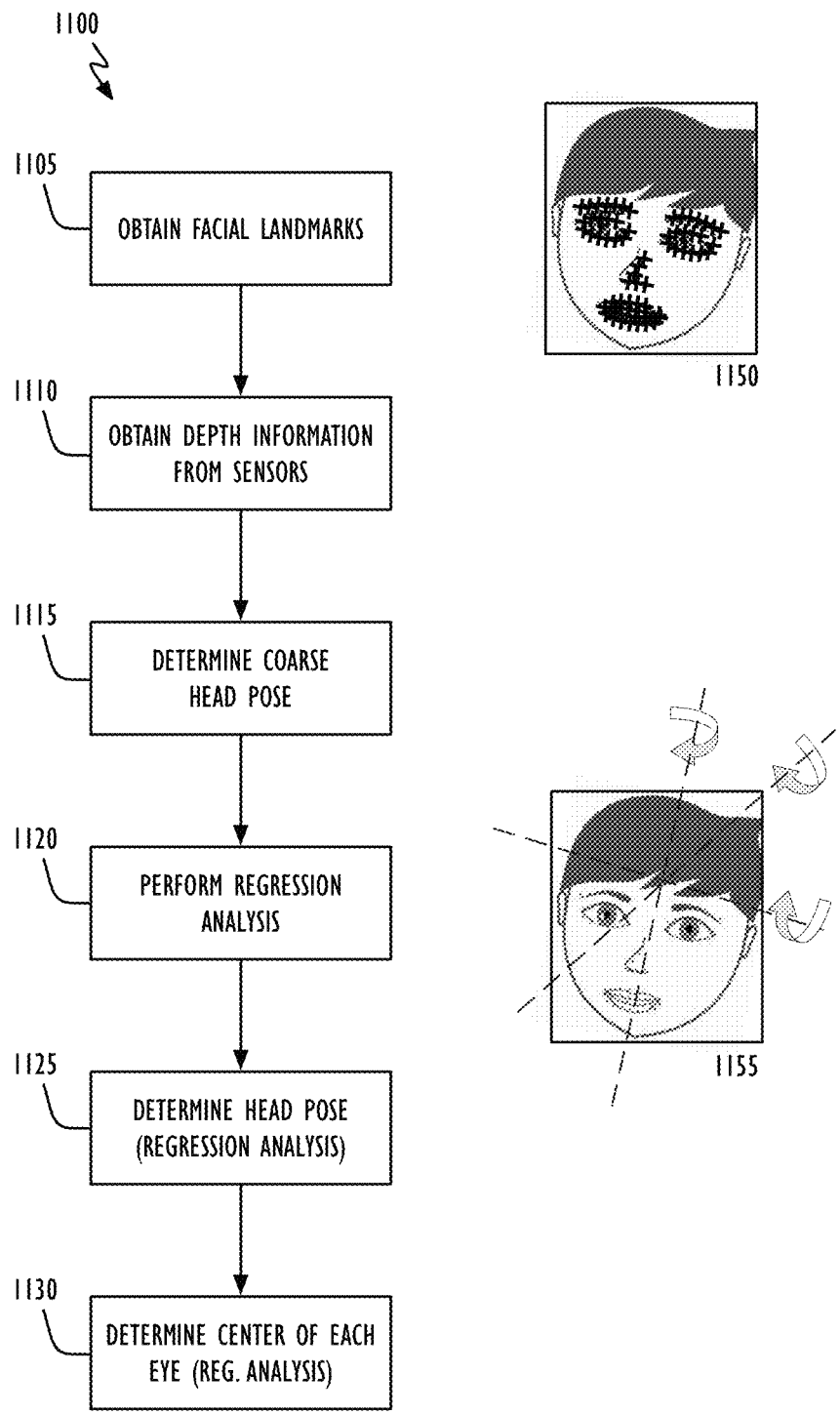
FIG. 11 shows, in flow diagram form, a method for determining a center of each eye, according to one or more embodiments.

FIG. 11 shows, in flowchart form, method 1100 for determining a center of each eye, according to one or more embodiments. Operation 1100 depicts a more detailed version of one or more embodiments of determining a center of each eye 1005. Although the various steps are depicted in a particular order, it should be understood that in one or more embodiments, the various steps may be performed in a different order, or some steps could be performed concurrently. Further, some steps may not be necessary, or other actions may be added. Moreover, for purposes of explanation, the various steps will be explained with respect to FIG. 9. However, it should be understood that the various steps could also apply to FIG. 8, or other figures described above. Moreover, the various operations could also apply to other embodiments not specifically depicted in the various examples.

Operation 1100 begins at 1105 when the facial landmarks are obtained from stereo images. According to one or more embodiments, the stereo images may be obtained from a stereo camera pair, such as 905L and 905R. However, the stereo images may be obtained by any other one or more stereo cameras. According to some embodiments, the facial landmarks may indicate identifiable characteristics in the face. In one or more embodiments the facial landmarks may be identified using depth analysis, feature extraction, or any other means or combination of means. An example of facial landmarks is depicted in 1150. In example 1150, the various landmarks indicate facial features, such as brows, nose, lips, and corners of the eyes. The flow chart continues at 1110, where, in one or more embodiments, additional sensor data is acquired, for example, from a depth sensor.

Illustrative operation 1100 continues at 1115 where a course head pose may be determined. Specifically, in certain embodiments, the depth information received from one or more depth sensors may be utilized to generate a depth map. The depth map may provide a general position of the head. In one or more embodiments, the depth map may be used along with the facial landmarks obtained in 1105 in a regression analysis against model data to determine a refined head location and orientation, at 1120. Example 1155 depicts an example of a location in an x, y, and z axis, along with a determined roll, pitch, and yaw of the head. According to one or more embodiments, the center of each eye may be determined based on the regression analysis performed at 1130. According to one or more embodiments, the regression analysis may provide models by which a location of each eye is obtained. Further, according to one or more other embodiments, the eye radius may be estimated based on the size of the pupil. The regression analysis may also provide model data to use in instances where a portion of the eyes is occluded in the images. Thus, the models may indicate where the eyes should be.

Figure 12:
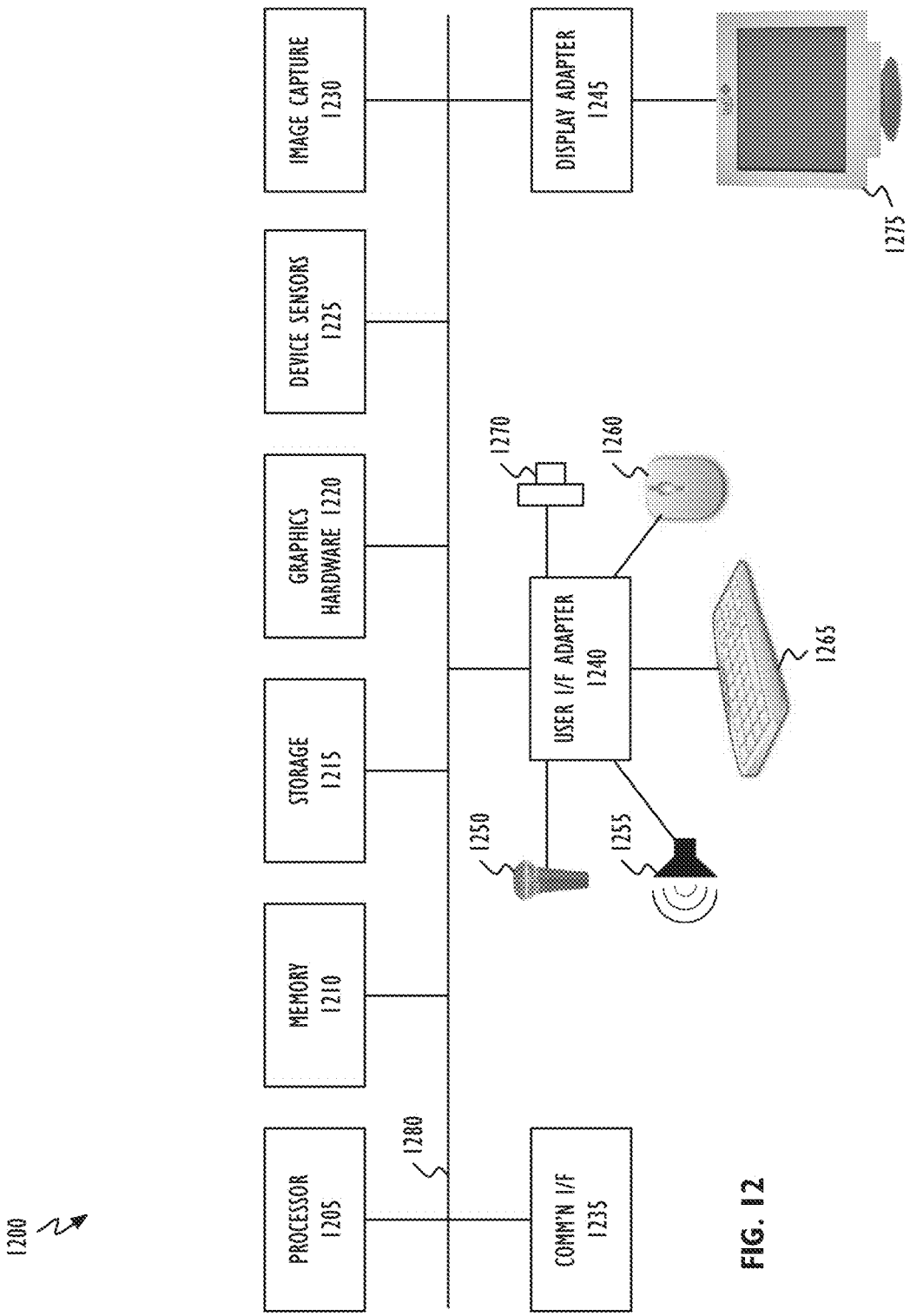
FIG. 12 shows, in block diagram form, a computer system in accordance with one embodiment.

Referring to FIG. 12, the disclosed pupil location and gaze tracking operations may be performed by representative computer system 1200 (e.g., a general purpose computer system such as a desktop, laptop, notebook or tablet computer system, or a gaming device). Computer system 1200 can be housed in single computing device or spatially distributed between two or more different locations. Computer system 1200 may include one or more processors 1205, memory 1210, one or more storage devices 1215, graphics hardware 1220, device sensors 1225, image capture module 1230, communication interface 1235, user interface adapter 1240 and display adapter 1245—all of which may be coupled via system bus or backplane 1280.

Processor module or circuit 1205 may include one or more processing units each of which may include at least one central processing unit (CPU) and/or at least one graphics processing unit (GPU); each of which in turn may include one or more processing cores. Each processing unit may be based on reduced instruction-set computer (RISC) or complex instruction-set computer (CISC) architectures or any other suitable architecture. Processor module 1205 may be a system-on-chip, an encapsulated collection of integrated circuits (ICs), or a collection of ICs affixed to one or more substrates. Memory 1210 may include one or more different types of media (typically solid-state, but not necessarily so) used by processor 1205, graphics hardware 1220, device sensors 1225, image capture module 1230, communication interface 1235, user interface adapter 1240 and display adapter 1245. For example, memory 1210 may include memory cache, read-only memory (ROM), and/or random access memory (RAM). Storage 1215 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1210 and storage 1215 may be used to retain media (e.g., audio, image and video files), preference information, device profile information, computer program instructions or code organized into one or more modules and written in any desired computer programming languages, and any other suitable data. When executed by processor(s) 1205 and/or graphics hardware 1220 and/or device sensors 1225 and/or functional elements within image capture module 1230 such computer program code may implement one or more of the methods described herein (e.g., any one or more of the operations disclosed in FIGS. 1-4). Graphics hardware module or circuit 1220 may be special purpose computational hardware for processing graphics and/or assisting processor 1205 perform computational tasks. In one embodiment, graphics hardware 1220 may include one or more GPUs, and/or one or more programmable GPUs and each such unit may include one or more processing cores. Device sensors 1225 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer a momentum sensor and a camera and light bar such as that illustrated in FIGS. 5-7. Image capture module or circuit 1230 may include one or more image sensors, one or more lens assemblies, and any other known imaging component that enables image capture operations (still or video). In one embodiment, the one or more image sensors may include a charge-coupled device (CCD) or complementary metal oxide semiconductor (CMOS) sensor. Image capture module 1230 may also include an image signal processing (ISP) pipeline that is implemented as specialized hardware, software, or a combination of both. The ISP pipeline may perform one or more operations on raw images (also known as raw image files) received from image sensors and can also provide processed image data to processor 1205, memory 1210, storage 1215, graphics hardware 1220, communication interface 1235 and display adapter 1245. Communication interface 1235 may be used to connect computer system 1200 to one or more networks. Illustrative networks include, but are not limited to, a local network such as a Universal Serial Bus (USB) network, an organization's local area network, and a wide area network such as the Internet. Communication interface 1235 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 1240 may be used to connect microphone(s) 1250, speaker(s) 1255, pointer device(s) 1260, keyboard 1265 (or other input device such as a touch-sensitive element), and a separate image capture element 1270—which may or may not avail itself of the functions provided by graphics hardware 1220 or image capture module 1230. Display adapter 1245 may be used to connect one or more display units 1275 which may also provide touch input capability. System bus or backplane 1280 may be comprised of one or more continuous (as shown) or discontinuous communication links and be formed as a bus network, a communication network, or a fabric comprised of one or more switching devices. System bus or backplane 1280 may be, at least partially, embodied in a network router or hub, a wireless access point (AP) or repeater, a set-top box, or a combination thereof.

Figure 13:
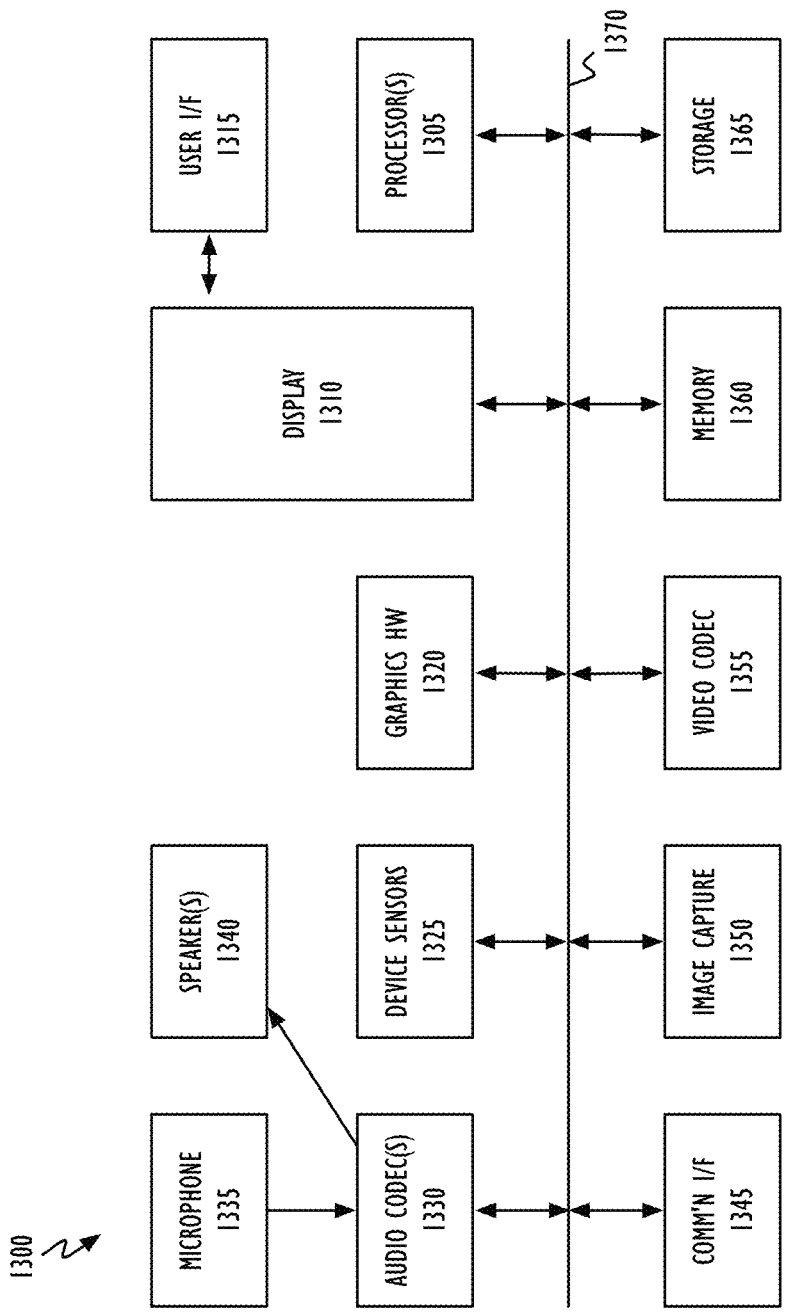
FIG. 13 shows, in block diagram form, a multi-function electronic device in accordance with one embodiment.

Referring to FIG. 13, a simplified functional block diagram of illustrative mobile electronic device 1300 is shown according to one embodiment. Electronic device 1300 could be, for example, a mobile telephone, personal media device, a notebook computer system, or a tablet computer system. As shown, electronic device 1300 may include processor module or circuit 1305, display 1310, user interface module or circuit 1315, graphics hardware module or circuit 1320, device sensors 1325, microphone(s) 1330, audio codec(s) 1335, speaker(s) 1340, communications module or circuit 1345, image capture module or circuit 1350, video codec(s) 1355, memory 1360, storage 1365, and communications bus 1370.

Processor 1305, display 1310, user interface 1315, graphics hardware 1320, device sensors 1325, communications circuitry 1345, image capture module or circuit 1350, memory 1360 and storage 1365 may be of the same or similar type and serve the same function as the similarly named component described above with respect to FIG. 12. Audio signals obtained via microphone 1330 may be, at least partially, processed by audio codec(s) 1335. Data so captured may be stored in memory 1360 and/or storage 1365 and/or output through speakers 1340. Output from image capture module or circuit 1350 may be processed, at least in part, by video codec(s) 1355 and/or processor 1305 and/or graphics hardware 1320. Images so captured may be stored in memory 1360 and/or storage 1365.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, in the description of initial pupil localization operation 110, the significance contour map has been described as if it had a 1:1 pixel correspondence with the associated gradient map. One of ordinary skill in the art will recognize this is not necessary. In addition, the gradient map used to generate a significance contour map may be filtered or unfiltered. Further, filter operations other than the described "soft threshold" may be applied during operations in accordance with block 320 (FIG. 3). In one or more embodiments, one or more of the disclosed steps may be omitted, repeated, and/or performed in a different order than that described herein. Accordingly, the specific arrangement of steps or actions shown in FIGS. 1-4 should not be construed as limiting the scope of the disclosed subject matter. The scope of the claimed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A system to capture images, comprising:
   an image capture device having a first field of view;
   a first light emitter and a second light emitter arranged on a first side of the image capture device and configured to emit light into the first field of view;
   a third light emitter and a fourth light emitter configured to emit light into the first field of view; and
   a control system operatively coupled to the first and second image capture devices, the control system configured to—
   cause the first light emitter and the second light emitter to alternately emit light, and the third light emitter and the fourth light emitter to alternately emit light,
   cause the first image capture device to capture a first image comprising a first eye concurrently with the first light emitter emitting light,
   cause the first image capture device to capture a second image of the first eye concurrently with the second light emitter emitting light,
   cause the image capture device to capture a third image comprising a second eye concurrently with the third light emitter emitting light, and
   cause the image capture device to capture a fourth image of the second eye concurrently with the fourth light emitter emitting light,
   determine that the first eye is less occluded by a glare in the first image than in the second image,
   in response to determining that the first eye is less occluded by a glare in the first image than in the second image, determine an initial pupil location for the first eye using the first image,
   determine that the second eye is less occluded by a glare in the third image than in the fourth image, and
   in response to determining that the second eye is less occluded by a glare in the third image than in the fourth image, determine an initial pupil location for the second eye using the second image.

2. The system of claim 1, wherein the first light emitter and the second light emitter comprise infrared light emitters.

3. The system of claim 1, wherein the control system is further configured to:
   cause the third light emitter and the fourth light emitter to alternately emit light,
   cause a second image capture device to capture a third image comprising a second eye concurrently with the third light emitter emitting light, and
   cause the second image capture device to capture a fourth image of the second eye concurrently with the fourth light emitter emitting light,
   determine that the second eye is less occluded by a glare in the third image than in the fourth image, and
   in response to determining that the first eye is less occluded by a glare in the third image than in the fourth image, determine an initial pupil location for the second eye using the first image.

4. The system of claim 1, wherein the first and third light emitters emit light concurrently, and wherein the second and fourth light emitters emit light concurrently.

5. The system of claim 1, wherein the control system is further configured to:
   detect a first two-dimensional (2D) region corresponding to the initial pupil location for the first eye;
   identify a second region wholly within the first region;
   identify a third region wholly outside the first region;
   identify an area between the second and third regions as a fourth region, the fourth region comprising a plurality of pixels;
   determine a gradient for at least some of the pixels in the fourth region;
   identify a first set of pixels from the plurality of pixels, wherein each pixel in the first set of pixels has a gradient value that meets a first criteria; and
   identify an updated pupil location for the first eye based on the first set of pixels.

6. The system of claim 5, wherein the control system is further configured to determine a first gaze direction based on the updated pupil location for the first eye.

7. A non-transitory computer readable medium comprising computer readable code executable by one or more processors to:
   cause a first light emitter and a second light emitter to alternately emit light, and a third light emitter and a fourth light emitter to alternately emit light,
   cause an image capture device to capture a first image comprising a first eye concurrently with the first light emitter emitting light, and
   cause the image capture device to capture a second image of the first eye concurrently with the second light emitter emitting light,
   cause the image capture device to capture a third image comprising a second eye concurrently with the third light emitter emitting light,
   cause the image capture device to capture a fourth image of the second eye concurrently with the fourth light emitter emitting light,
   determine that the first eye is less occluded by a glare in the first image than in the second image,
   in response to determining that the first eye is less occluded by a glare in the first image than in the second image, determine an initial pupil location for the first eye using the first image,
   determine that the second eye is less occluded by a glare in the third image than in the fourth image, and
   in response to determining that the second eye is less occluded by a glare in the third image than in the fourth image, determine an initial pupil location for the second eye using the second image.

8. The non-transitory computer readable medium of claim 7, wherein the first light emitter and the second light emitter comprise infrared light emitters.

9. The non-transitory computer readable medium of claim 7, further comprising computer readable code to:
cause the third light emitter and the fourth light emitter to alternately emit light,
cause a second image capture device to capture a third image comprising a second eye concurrently with the third light emitter emitting light, and
cause the second image capture device to capture a fourth image of the second eye concurrently with the fourth light emitter emitting light,
determine that the second eye is less occluded by a glare in the third image than in the fourth image, and
in response to determining that the first eye is less occluded by a glare in the third image than in the fourth image, determine an initial pupil location for the second eye using the first image.

10. The non-transitory computer readable medium of claim 7, wherein the first and third light emitters emit light concurrently, and wherein the second and fourth light emitters emit light concurrently.

11. The non-transitory computer readable medium of claim 7, further comprising computer readable code to:
detect a first two-dimensional (2D) region corresponding to the initial pupil location for the first eye;
identify a second region wholly within the first region;
identify a third region wholly outside the first region;
identify an area between the second and third regions as a fourth region, the fourth region comprising a plurality of pixels;
determine a gradient for at least some of the pixels in the fourth region;
identify a first set of pixels from the plurality of pixels, wherein each pixel in the first set of pixels has a gradient value that meets a first criteria; and
identify an updated pupil location for the first eye based on the first set of pixels.

12. The system of claim 11, further comprising computer readable code to determine a first gaze direction based on the updated pupil location for the first eye.

13. A method for determining pupil location, comprising:
causing a first light emitter and a second light emitter to alternately emit light, and a third light emitter and a fourth light emitter to alternately emit light,
causing an image capture device to capture a first image comprising a first eye concurrently with the first light emitter emitting light,
causing the image capture device to capture a second image of the first eye concurrently with the second light emitter emitting light,
causing the image capture device to capture a third image comprising a second eye concurrently with the third light emitter emitting light,
causing the image capture device to capture a fourth image of the second eye concurrently with the fourth light emitter emitting light,
determining that the first eye is less occluded by a glare in the first image than in the second image,
in response to determining that the first eye is less occluded by a glare in the first image than in the second image, determining an initial pupil location for the first eye using the first image,
determining that the second eye is less occluded by a glare in the third image than in the fourth image, and
in response to determining that the second eye is less occluded by a glare in the third image than in the fourth image, determining an initial pupil location for the second eye using the second image.

14. The method of claim 13, wherein the first light emitter and the second light emitter comprise infrared light emitters.

15. The method of claim 13, further comprising:
detecting a first two-dimensional (2D) region corresponding to the initial pupil location for the first eye;
identifying a second region wholly within the first region;
identifying a third region wholly outside the first region;
identifying an area between the second and third regions as a fourth region, the fourth region comprising a plurality of pixels;
determining a gradient for at least some of the pixels in the fourth region;
identifying a first set of pixels from the plurality of pixels, wherein each pixel in the first set of pixels has a gradient value that meets a first criteria; and
identifying an updated pupil location for the first eye based on the first set of pixels.

16. The method of claim 15, further comprising determining a first gaze direction based on the updated pupil location for the first eye.

* * * * *